L. S. CUNNY.
TENSION LIMIT FOR SPRINGS.
APPLICATION FILED APR. 17, 1914.

1,208,298.

Patented Dec. 12, 1916.

Witnesses:
Robert V. Weir
Arthur W. Cooper

Inventor
Louis S. Cunny
Edwin B. H. Javes Jr.
Atty

UNITED STATES PATENT OFFICE.

LOUIS S. CUNNY, OF NIAGARA FALLS, NEW YORK, ASSIGNOR, BY MESNE ASSIGNMENTS, TO U. S. LIGHT AND HEAT CORPORATION, OF NIAGARA FALLS, NEW YORK, A CORPORATION OF NEW YORK.

TENSION-LIMIT FOR SPRINGS.

1,208,298.

Specification of Letters Patent.

Patented Dec. 12, 1916.

Application filed April 17, 1914. Serial No. 832,497.

*To all whom it may concern:*

Be it known that I, LOUIS S. CUNNY, a citizen of the United States, residing at Niagara Falls, in the county of Niagara and State of New York, have invented new and useful Improvements in Tension-Limits for Springs, of which the following is a full, clear, concise, and exact description, reference being had to the accompanying drawing, forming a part of this specification.

My invention relates to tension limits for springs.

Car lighting generators are usually driven by a belt running from a pulley on one of the car axles to a pulley on the generator armature shaft. In order to maintain the proper tension on the belt, it is customary to provide some form of tension device which normally tends to force the generator away from the driving axle. Such devices, in many instances, include a tension rod passing through a relatively fixed support and attached at one end, either to the generator or to some portion of the frame which supports the generator. The other end of the rod is provided with an adjustable nut, whereby the spring carried by said rod, is confined between said fixed support and nut, thereby tending to thrust said rod in a direction to place the driving belt under tension.

An object of my invention is to provide means whereby the tension applied to the driving belt of a generator can be definitely limited to a predetermined amount.

Another object of my invention is to provide means whereby the tension applied to the belt tensioning springs of a generator suspension can be accurately limited to a predetermined amount.

Other objects of my invention will hereinafter appear.

Figure 1:
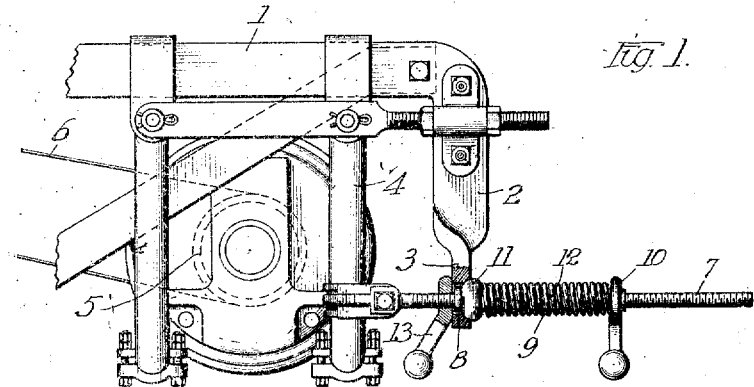
Figure 2:
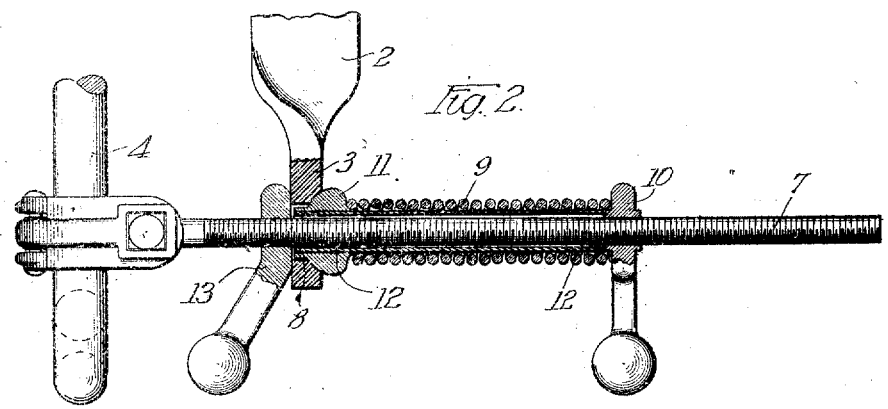

In order that my invention may be clearly disclosed I have illustrated one embodiment thereof in the accompanying drawings, in which:

Figure 1 is an elevation of one form of generator suspension illustrating the relation of the tension limiting device to the other parts of the apparatus. Fig. 2 is an enlarged section of the tension limit and adjacent parts.

The generator suspension selected for the purpose of illustrating the use of the tension limit, comprises a pair of substantially parallel-suspension bars 1, which project beyond the end of a car truck, not shown. The outer ends 2 of these bars are bent downwardly, as shown in Fig. 1, and have their extremities 3 twisted in a plane at right angles to the plane of the bars. Slidably supported by the suspension bars are a pair of U-shaped slings 4, upon which a car lighting generator 5, is mounted. The generator is driven from the car axle by a belt 6. Attached to one of the slings is a tension rod 7. This rod extends through the opening 8 in the twisted extremity of the suspension bar and is provided with a threaded portion of sufficient length to extend for a considerable distance on either side of the opening 8. The rod is normally forced away from the generator by the spring 9, held between the nut 10 and the bushing 11. The spring 9 governs the tension on the driving belt 6. The tension on the spring 9 is regulated by adjusting the nut 10 along the tension rod.

In order to limit the amount of tension that can be applied to the driving belt by the spring 9, a sleeve 12 is fitted on the tension rod between the nut 10 and the adjustable nut 13 carried by the tension rod on the opposite side of the extremity 3 of the suspension bar from the nut 10. The sleeve fits within the spring and the bushing 11, and is of such a length that when the nuts 10 and 13 are adjusted so as to abut against its ends, the spring will have its maximum tension, that is, the proper amount of tension to be applied to the driving belt. By this means the tension on the belt may be accurately limited to a predetermined amount, thereby increasing the efficiency of the apparatus.

When, during inspection, it is desirable to operate the generator as a motor from the storage batteries, the driving belt may be slackened by turning the adjusting nuts 10 and 13 in a direction to force the generator toward the car axle.

The embodiment of my invention described herein has been selected merely for the purpose of illustration.

My invention covers all other means for accomplishing the desired result so long as such means fall within the scope of the appended claims.

Obviously the invention may be applied to other types of suspension than the one specifically illustrated and described herein and is not limited to a suspension directly applied to a car truck.

What I claim as new and desire to secure by Letters Patent of the United States is:

1. In combination, a movably mounted generator, a belt for driving said generator, means for placing said belt under tension, and means for limiting the amount of tension that can be applied to said belt.

2. In a generator suspension, a tension rod, a relatively fixed support therefor, a spring carried by said rod, means for placing said spring under tension, and means for limiting the amount of tension that can be applied to said spring.

3. In a generator suspension, a tension rod, a spring carried thereby, means for placing said spring under tension, and means for limiting the amount of tension that can be applied to said spring.

4. In a generator suspension, a tensioning member, a relatively fixed support therefor, a spring carried by said member, and a sleeve for limiting the amount of tension that can be applied to said spring.

5. A generator suspension for an axle driven generator including a movably mounted frame for supporting the generator on the car, a relatively fixed member in proximity thereto, a tension member connected to said movable frame, an adjustable spring confined between said relatively fixed member and an adjustable portion of said tension member, an abutment on said tension member, and a rigid member adjacent said tension member and confined between said abutment and said adjustable portion to limit the amount of tension which may be applied to said spring.

In witness whereof, I have hereunto subscribed my name in the presence of two witnesses.

LOUIS S. CUNNY.

Witnesses:
WM. A. FROBAYNE,
ERNST BAUER.